United States Patent
Schoo et al.

(10) Patent No.: US 6,497,307 B1
(45) Date of Patent: Dec. 24, 2002

(54) FRICTION SURFACE COATING FOR A FRICTION MATERIAL OF A BRAKE SYSTEM

(75) Inventors: Norbert Schoo, Hamburg (DE); Uwe Schwarz, Buchholz (DE); Hansjörg Grimme, Glinde (DE); Thomas Pfannebecker, Hamburg (DE)

(73) Assignee: AlliedSignal Bremsbelag GmbH, Glinde (DE)

( * ) Notice: Subject to any disclaimer, the term of this patent is extended or adjusted under 35 U.S.C. 154(b) by 0 days.

(21) Appl. No.: 09/471,204

(22) Filed: Dec. 23, 1999

(30) Foreign Application Priority Data

Jan. 20, 1999 (DE) .................... 299 00 868 U
Jan. 27, 1999 (DE) .................... 299 01 314 U

(51) Int. Cl.⁷ ............................. F16D 69/00
(52) U.S. Cl. ............ 188/251 A; 523/152; 188/73.1; 188/264 B
(58) Field of Search ............ 188/251 A, 73.1, 188/264 B; 428/525, 323, 402, 460, 524; 252/29, 30; 523/149, 153, 155, 156, 158, 152; 524/406, 594

(56) References Cited

U.S. PATENT DOCUMENTS

| | | | | |
|---|---|---|---|---|
| 4,663,060 A | * | 5/1987 | Holinski | 252/12 |
| 5,441,799 A | * | 8/1995 | Owens et al. | 428/312.2 |
| 5,576,358 A | * | 11/1996 | Lem et al. | 523/153 |
| 5,622,785 A | * | 4/1997 | Gaylor et al. | 428/525 |
| 5,656,563 A | * | 8/1997 | Chen et al. | 501/90 |
| 5,834,551 A | * | 11/1998 | Haraguchi et al. | 524/492 |
| 6,051,646 A | * | 4/2000 | Nass et al. | 524/556 |

FOREIGN PATENT DOCUMENTS

| | | | |
|---|---|---|---|
| DE | 299 01 314 U1 | | 6/1999 |
| GB | 2155809 | * | 10/1985 |
| WO | 8101375 | | 5/1981 |
| WO | 9840641 | | 9/1998 |
| WO | 98/40641 | * | 9/1998 |

\* cited by examiner

Primary Examiner—Christopher P. Schwartz
Assistant Examiner—Devon Kramer
(74) Attorney, Agent, or Firm—Friedrich Kueffner

(57) ABSTRACT

A friction surface coating (200) for a friction material of a brake system, especially for a motor vehicle, a truck, a rail vehicle or an aircraft, is composed of 0–30% in weight phenolic resin, 5–95% in weight aluminum oxide, 0–20% in weight silicium oxide, 5–75% in weight bonding agent, 0–10% in weight interlacing agent, 0–50% in weight elastomer and 0–50% in weight filler.

19 Claims, 1 Drawing Sheet

FRICTION SURFACE COATING FOR A FRICTION MATERIAL OF A BRAKE SYSTEM

This invention relates to a friction surface coating for a friction material of a brake system especially for a motor vehicle, a truck, a rail vehicle or an aircraft. Furthermore, the invention relates to a brake lining, especially for a disk brake, with a carrier plate and a friction material block placed thereon which constitutes a friction surface.

BACKGROUND OF THE INVENTION

For the tribological system disk brake, a desired coefficient of friction arises between a disk brake and a brake lining only after a certain number of braking actions. These braking actions, in which a new friction pairing which is not yet run-in possesses a coefficient of friction which greatly depends on the running-in state, are also designated as running-in braking actions. For the coefficient of friction, geometrical adaptations between the brake lining and the brake disk and a tribological boundary layer constitution, generally designated as friction coal, are essential influence parameters. Only when the boundary layer and the geometry are sufficiently constituted by the running-in braking actions, we come with the coefficient of friction of the system to the so-called steady condition. Thus, the friction pairing reaches a run-in state and thus the desired coefficient of friction level only after a relatively high number of running-in braking actions.

Under certain automotive engineering operating conditions, there comes however to problems due to the difference between the run-in system and the not run-in system. For example truck trailers are brake tested after manufacturing. Referred to nine tons axle load extrapolated to 6,5 bar, the vehicle must reach at least 45% (50%) deceleration. These tests take place most of the time on roller type test stands with a low test speed at the manufacturer's in-situ or at the nearest technical surveyance location to which the vehicle is brought with very low brake pressures. But the decelerations must also be dynamically reached when testing the brake system of the double train on the road by higher speeds. Here it has been found as a problem that a new disk brake system in not run-in state most of the time does not comply with the above mentioned requirements.

The aim of this invention is to make available an improvement of the tribological system brake, especially of a disk brake, which eliminates the above mentioned disadvantages and also reaches sufficient coefficients of friction in not run-in state.

SUMMARY OF THE INVENTION

This aim is achieved by a friction surface coating of the above mentioned type and by a brake lining of the above mentioned type, wherein the friction surface coating contains 0 to 30% in weight phenolic resin, 5 to 95% in weight aluminum oxide, 0 to 20% in weight silicium oxide, 5 to 75% bonding agent, 0 to 10% in weight interlacing agent, 0 to 50% in weight elastomer and 0 to 50% in weight filler.

This has the advantage that a sufficient and reliable coefficient of friction is obtained in each test state of a brake installation, for example of a vehicle, even with a (disk) brake system which is not yet run-in. The coefficient of friction of the system which is not run-in made of the brake disk with the brake linings and the coating placed thereon substantially corresponds to the coefficient of friction of the run-in system. For this reason, the system which is not run-in efficiently obtains with the coating according to the invention a required braking ratio under all test conditions such as roller type test stand in-situ, roller type test stand separate from the manufacturing place, dynamic test of a truck with trailer. Here the coating according to the invention also develops its advantageous effect under different relative speeds between the brake lining and the brake disk. The coating is simultaneously sufficiently resistant to abrasion so that it also functions when the testing place is remote from the manufacturing place. Moreover there is no downfall of the coefficient of friction by the transition from the effect of the coating to the run-in state.

For applying the friction surface coating by means of screen printing process, with a spray gun or with an impregnated foam, the friction surface coating further advantageously shows 20 to 80% in weight, especially 50% in weight, solvent, especially water.

Here the phenolic resin is for example a phenol resol in water (70 to 80% solid content), especially resin 9126 SW, the aluminium oxide corundum in form of Rhinalox special fused alumina white, especially Bikorit F 280, the silicium oxide silicic acid, for example in form of a hydrophobic $SiO_2$ as a loose white powder, especially Aerosil R 972, the bonding agent a phenolic/cresylic resin/NBR bonding agent on water base (hydroadhesive), especially W9-9501 bonding agent WK 700 C, the interlacing agent a mixture of organic solvents and additives, especially ZG-1496 in form of a brownish additive, the elastomer a rubber or a rubber flour in form of a recycled product made of treads on SBR/NR base, especially rubber flour 289 055 and the filler, for example a colouring agent, especially soot, especially Cabot Farbruß Elftex 430.

In a first preferred embodiment, the friction surface coating shows 3% in weight phenolic resin, 54,8% in weight aluminium oxide, 3,2% in weight silicium oxide, 38% in weight bonding agent and 1% in weight interlacing agent.

In a second preferred embodiment, the friction surface coating shows 56,49% in weight aluminium oxide, 3,3% in weight silicium oxide, 39,18% in weight bonding agent and 1,03% in weight interlacing agent.

In a third preferred embodiment, the friction surface coating shows 49,12% in weight aluminium oxide, 2,87% in weight silicium oxide, 34,07% in weight bonding agent, 0,9% in weight interlacing agent and approximately 13,04% elastomer.

In a fourth preferred embodiment, the friction surface coating shows 41,99–31,99% in weight aluminium oxide, 10–20% in weight silicium oxide, 34,07% in weight bonding agent, 0,9% in weight interlacing agent and approximately 13,04% elastomer.

For a brake lining according to the invention of the above mentioned type, a friction surface coating as mentioned above is provided for on the friction surface.

BRIEF DESCRIPTION OF THE DRAWINGS

The invention will be explained in detail below with reference to the annexed drawings.

DETAILED DESCRIPTION OF THE PREFERRED EMBODIMENT

Figure 1:
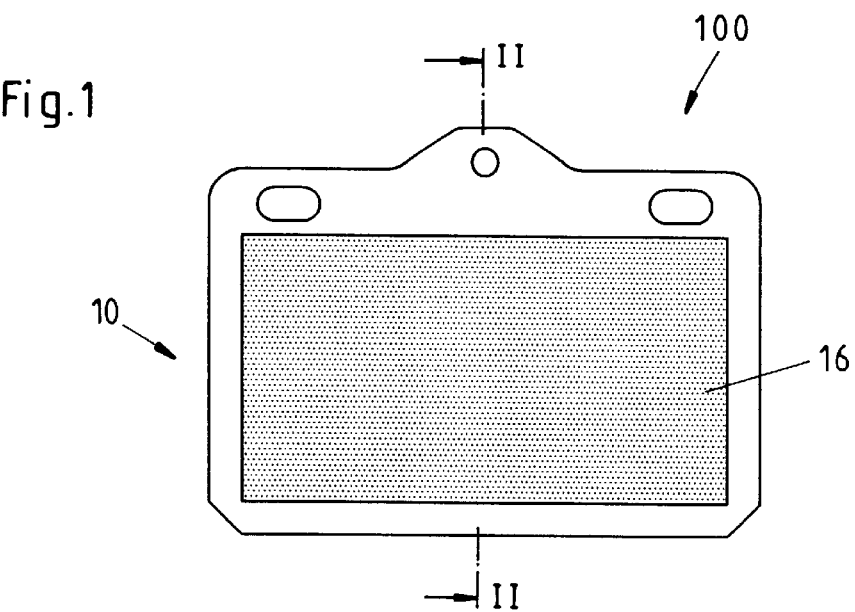
FIG. 1 shows a preferred embodiment of a brake lining according to the invention in a top view.
Figure 2:
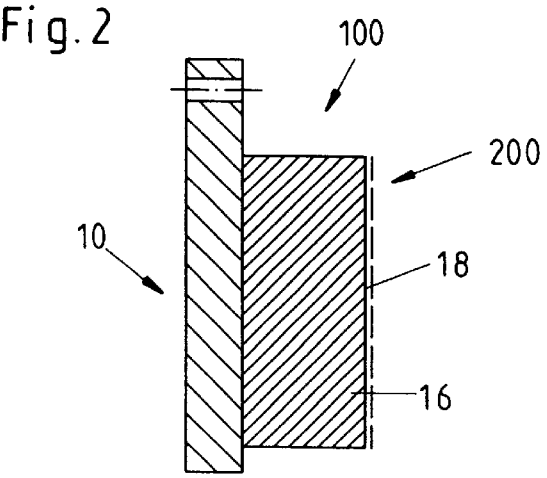
FIG. 2 shows a preferred embodiment of a brake lining according to the invention in a sectional view along the line II-II of FIG. 1.
Figure 3:
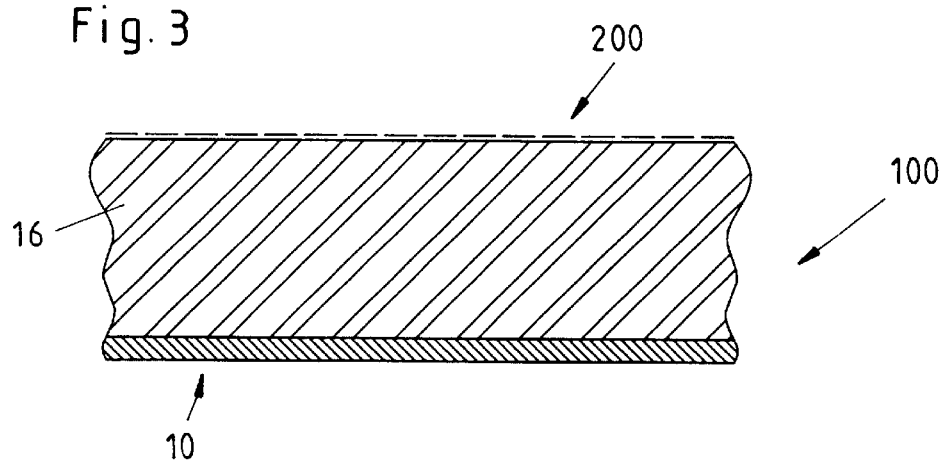
FIG. 3 shows a preferred embodiment of a brake lining according to the invention in a longitudinal section.

The preferred embodiment of a brake lining 100 represented in FIGS. 1 to 3 comprises a carrier plate 10 on which a friction material block 16 is placed. A free surface of the friction material block 16 constitutes a friction surface 18 for a brake disk of a brake system, brake disk which is not represented.

A friction surface coating 200 is applied according to the invention on the friction surface after manufacturing of the brake block. This is carried out for example by means of a paint sprayer or a sponge or a foam impregnated with the friction surface coating. For the preferred applying process, the application is made with a squeegee and a stencil adapted to the friction lining contour (modified screen printing process).

The friction surface coating 200 according to the invention contains according to the invention the following components 0 to 30% in weight phenolic resin, 5 to 95% in weight aluminium oxide, 0 to 20% in weight silicium oxide, 5 to 75% in weight bonding agent, 0 to 10% in weight interlacing agent, 0 to 50% elastomer and 0 to 50% in weight filler.

Here the phenolic resin is a phenol-resol in water (70–80% solid content), especially resin 9216 SW, the aluminium oxide, corundum in form of Rhinalox special fused alumina white, especially Bikorit F 280, the silicium oxide silicic acid, for example in form of a hydrophobic $SiO_2$ as a loose white powder, especially Aerosil R 972, the bonding agent a phenolic/cresylic resin/NBR bonding agent on water base (hydroadhesive), especially W9-9501 bonding agent WK 700 C, the interlacing agent a mixture of organic solvents and additives, especially ZG-1496 in form of a brownish additive, the elastomer a rubber or a rubber flour in form of a recycled product made of treads on SBR/NR base, especially rubber flour 289 055 and the filler, for example a colouring agent, especially soot, especially Cabot Farbruβ Elftex 430.

For applying the friction surface coating according to the invention, this friction surface coating is appropriately diluted with a solvent, such as for example water, so that the friction surface coating can be processed according to the applying process. For this purpose, a solvent content of 20 to 80% in weight, especially of 50% in weight, is provided for.

Tests with different percentiles of the above mentioned components have shown that the following preferred embodiments are particularly appropriate as a friction surface coating.

In a first preferred embodiment, the friction surface coating shows 3% in weight phenolic resin, 54,8% in weight aluminium oxide, 3,2% in weight silicium oxide, 38% in weight bonding agent and 1% in weight interlacing agent.

In a second preferred embodiment, the friction surface coating shows 56,49% in weight aluminium oxide, 3,3% in weight silicium oxide, 39,18% in weight bonding agent and 1,03% in weight interlacing agent.

In a third preferred embodiment, the friction surface coating shows 49,12% in weight aluminium oxide, 2,87% in weight silicium oxide, 34,07% in weight bonding agent, 0,9% in weight interlacing agent and approximately 13,04% in weight elastomer.

In a fourth preferred embodiment, the friction surface coating shows 41,99–31,99% in weight aluminium oxide, 10–20% in weight silicium oxide, 34,07% in weight bonding agent, 0,9% in weight interlacing agent and approximately 13,04% in weight elastomer.

What is claimed is:

1. A friction surface coating for a friction material of a tribological system brake capable of obtaining sufficient coefficient of friction in not run-in state of the brake, the friction surface coating being comprised of 0–30% by weight phenolic resin, 5–95% by weight aluminum oxide, >0–20% by weight silicon oxide, 5–75% by weight bonding agent, 0–10% by weight interlacing agent, 0–50% by weight elastomer and 0–50% by weight filler.

2. The friction surface coating according to claim 1, wherein the friction surface coating comprises 20–80% by weight solvent.

3. The friction surface coating according to claim 1, wherein the friction surface coating comprises 50% by weight solvent.

4. The friction surface coating according to claim 2, wherein the solvent is water.

5. The friction surface coating according to claim 1, wherein the aluminum oxide is corundum.

6. The friction surface coating according to claim 1, wherein the silicon oxide is silicic acid.

7. The friction surface coating according to claim 6, wherein the silicic acid is hydrophobic $SiO_2$.

8. The friction surface coating according to claim 1, wherein the bonding agent is a phenolic/cresilic/NBR bonding agent.

9. The friction surface coating according to claim 1, wherein the interlacing agent is a mixture of organic solvents and ZG-1496 in the form of a brownish additive.

10. The friction surface coating according to claim 1, wherein the elastomer is a rubber or a rubber flour in the form of a recycled product made of treads.

11. The friction surface coating according to claim 1, wherein the filler is a coloring agent.

12. The friction surface coating according to claim 11, wherein the coloring agent is soot.

13. The friction surface coating according to claim 1, comprising 3% by weight phenolic resin, 54.8% by weight aluminum oxide, 3.2% by weight silicon oxide, 38% by weight bonding agent and 1% by weight interlacing agent.

14. The friction surface coating according to claim 1, comprising 56.49% by weight aluminum oxide, 3.3% by weight silicon oxide, 39.18% by weight bonding agent and 1.03% by weight interlacing agent.

15. The friction surface coating according to claim 1, comprising 49.12% by weight aluminum oxide, 2.87% by weight silicon oxide, 34.07% by weight bonding agent, 0.9% by weight interlacing agent and approximately 13.04% by weight elastomer.

16. The friction surface coating according to claim 1, comprising 31.99–41.99% by weight aluminum oxide, 10–20% by weight silicon oxide, 34.07% by weight bonding agent, 0.9% by weight interlacing agent and approximately 13.04% by weight elastomer.

17. A friction surface coating for a friction material of a tribological system brake capable of obtaining sufficient coefficient of friction in not run-in state of the brake, the friction surface coating being comprised of >0–30% by weight phenolic resin, 5–95% by weight aluminum oxide, >0–20% by weight silicon oxide, 5–75% by weight bonding agent, 0–10% by weight interlacing agent, 0–50% by weight elastomer and 0–50% by weight filler, wherein the phenolic resin is a phenyl/resol in water with a 70–80% solid content.

18. A friction surface coating for a friction material of a tribological system brake capable of obtaining sufficient coefficient of friction in not run-in state of the brake, the friction surface coating being comprised of >0–30% by weight phenolic resin, 5–95% by weight aluminum oxide, >0–20% by weight silicon oxide, 5–75% by weight bonding agent, 0–10% by weight interlacing agent, 0–50% by weight elastomer, 0–50% by weight filler and 20–80% by weight solvent, wherein the phenolic resin is a phenyl/resol in water with a 70–80% solid content.

19. A brake lining comprising a carrier plate and a friction material block mounted thereon, wherein the friction material block has a friction surface, the friction surface having a friction surface coating capable of obtaining sufficient coefficient of friction in not run-in state of the brake, the friction surface coating comprising >0–30% by weight phenolic resin, 5–95% by weight aluminum oxide, >0–20% by weight silicon oxide, 5–75% by weight bonding agent, 0–10% by weight interlacing agent, 0–50% by weight elastomer and 0–50% by weight filler, wherein the phenolic resin is a phenyl/resol in water with a 70–80% solid content.

* * * * *